US009510066B2

(12) United States Patent
Cornwall et al.

(10) Patent No.: US 9,510,066 B2
(45) Date of Patent: Nov. 29, 2016

(54) COLLECTION OF TELEMETRY DATA THROUGH A METER READING SYSTEM

(75) Inventors: Mark K. Cornwall, Spokane, WA (US); James P. Ogle, Spokane, WA (US)

(73) Assignee: ITRON, INC., Liberty Lake, WA (US)

( * ) Notice: Subject to any disclaimer, the term of this patent is extended or adjusted under 35 U.S.C. 154(b) by 1502 days.

(21) Appl. No.: 12/889,610

(22) Filed: Sep. 24, 2010

(65) Prior Publication Data
US 2011/0074598 A1    Mar. 31, 2011

Related U.S. Application Data

(60) Provisional application No. 61/246,566, filed on Sep. 29, 2009.

(51) Int. Cl.
*H04Q 9/00*        (2006.01)
*G01D 4/00*        (2006.01)

(52) U.S. Cl.
CPC ............... *H04Q 9/00* (2013.01); *G01D 4/004* (2013.01); *G01D 4/00* (2013.01); *G01D 4/002* (2013.01); *H04Q 2209/00* (2013.01); *H04Q 2209/10* (2013.01); *H04Q 2209/40* (2013.01); *H04Q 2209/50* (2013.01); *H04Q 2209/60* (2013.01); *Y02B 90/242* (2013.01); *Y04S 20/322* (2013.01)

(58) Field of Classification Search
CPC ............... H04Q 9/00; H04Q 2209/00; H04Q 2209/10; H04Q 2209/40; H04Q 2209/60; G01D 4/00; G01D 4/002; G01D 4/004; Y02B 90/241; Y02B 90/242; Y04S 20/32; Y04S 20/322; G01F 15/00; G01F 15/02; G01F 15/022; G01F 15/024; G01F 15/04

USPC ............ 340/870.01, 870.02, 870.07; 73/861, 73/861.01, 199, 204.18, 204.19
See application file for complete search history.

(56) References Cited

U.S. PATENT DOCUMENTS

| 3,815,126 | A | * | 6/1974 | Batz | ................................. | 341/1 |
| 3,944,723 | A | * | 3/1976 | Fong | ................................. | 178/3 |
| 4,238,825 | A | * | 12/1980 | Geery | .................. | G01F 15/046 377/21 |
| 5,801,643 | A | | 9/1998 | Williams et al. | | |
| 6,088,659 | A | | 7/2000 | Kelley et al. | | |

(Continued)

FOREIGN PATENT DOCUMENTS

WO     WO 2007037616 A1 *  4/2007  ............... 340/870.02

OTHER PUBLICATIONS

David J. Southern P.E., Product Development Manager, FreeWave Technologies, Inc., "Operators Extend SCADA Investment to Vital Cathodic Protection", pp. 16-17 of *Remote Site & Equipment Management Magazine*, Jun./Jul. 2008.

(Continued)

*Primary Examiner* — Hai Phan
*Assistant Examiner* — Franklin Balseca

(57) ABSTRACT

Disclosed are apparatus and related methodologies for transmitting data related to utility conditions between monitoring locations and a central and/or data collection facility using a meter reading system. Collection of both corrected and uncorrected data from meters is achieved to thereby provide backup data in case of corrector failure. The presently disclosed subject matter also provides for the collection of telemetry data and alarms from correctors and recorders over a meter reading system. Two-way communications over a meter reading system is also provided to permit data transmission to selected endpoint devices.

10 Claims, 3 Drawing Sheets

(56) References Cited

U.S. PATENT DOCUMENTS

| | | |
|---|---|---|
| 6,366,217 B1 | 4/2002 | Cunningham et al. |
| 7,027,957 B2 | 4/2006 | Fourie et al. |
| 7,058,523 B2 | 6/2006 | Ramirez |
| 7,068,052 B2 | 6/2006 | Hilleary et al. |
| 7,069,161 B2 | 6/2006 | Gristina et al. |
| 7,298,288 B2 | 11/2007 | Nagy et al. |
| 7,301,475 B2 * | 11/2007 | Salazar Cardozo ..... 340/870.02 |
| 7,337,078 B2 * | 2/2008 | Bond et al. ..................... 702/51 |
| 7,661,306 B2 * | 2/2010 | Crottie ............................ 73/275 |
| 7,688,220 B2 * | 3/2010 | Bovankovich et al. . 340/870.02 |
| 8,054,199 B2 * | 11/2011 | Addy ....................... 340/870.02 |
| 2001/0010032 A1 | 7/2001 | Ehlers et al. |
| 2002/0030604 A1 | 3/2002 | Chance et al. |
| 2002/0039069 A1 | 4/2002 | Chance et al. |
| 2002/0109607 A1 * | 8/2002 | Cumeralto et al. ...... 340/870.02 |
| 2006/0031180 A1 | 2/2006 | Tamarkin et al. |
| 2008/0074285 A1 * | 3/2008 | Guthrie ................... 340/870.02 |
| 2008/0177678 A1 | 7/2008 | Di Martini et al. |
| 2008/0180275 A1 * | 7/2008 | Whitaker et al. ........ 340/870.03 |
| 2008/0219210 A1 * | 9/2008 | Shuey .................... G01D 4/006 370/329 |
| 2009/0111520 A1 | 4/2009 | Ring |
| 2010/0036939 A1 | 2/2010 | Yang et al. |

OTHER PUBLICATIONS

USPTO Non-Final Office Action issued Dec. 1, 2011 for U.S. Appl. No. 12/890,786.
PCT International Search Report for PCT International Application No. PCT/US2010/049820 dated Nov. 15, 2010.
PCT Written Opinion of the International Searching Authority for PCT International Application No. PCT/US2010/049820 dated Nov. 15, 2010.
PCT International Search Report for PCT International Application No. PCT/US2010/050340 dated Nov. 26, 2010.
PCT Written Opinion of the International Searching Authority for PCT International Application No. PCT/US2010/050340 dated Nov. 26, 2010.
U.S. Appl. No. 12/887,856 Office Action dated Jan. 7, 2013.
Notice of Acceptance dated Mar. 5, 2013 for Australian Patent Application No. 2010298382.

* cited by examiner

# COLLECTION OF TELEMETRY DATA THROUGH A METER READING SYSTEM

PRIORITY CLAIM

This application claims the benefit of previously filed U.S. Provisional Patent Application entitled "COLLECTION OF TELEMETRY DATA THROUGH A METER READING SYSTEM," assigned U.S. Ser. No. 61/246,566, filed Sep. 29, 2009, and which is incorporated herein by reference for all purposes.

FIELD OF THE INVENTION

The present subject matter relates to meter reading systems. More specifically, the present subject matter relates to methodologies for transmitting data related to utility conditions between monitoring locations and a central and/or data collection facility using a meter reading system.

BACKGROUND OF THE INVENTION

For gas utilities, there are several system integrity activities that are labor intensive and expensive to perform. Gas utilities presently utilize correctors installed at the meter to compensate meter readings for pressure and temperature to more accurately calculate gas usage. For example, pressure recorders have paper charts that either need to be replaced each week or the pressure values need to be downloaded to a portable computer. Currently, meter reads from such correctors are returned to a meter reading system as pulse counts of corrected usage. Existing gas endpoints are capable of capturing and reporting a single corrected reading.

Correctors are generally used on high volume, e.g., commercial, meters, and contain many metering parameters that are not typically brought back to an associated utility through an Automated Meter Reading (AMR) network. Temperature is one parameter of known particular interest since there is a relationship between temperature and pressure that can alter the accuracy of the measurement of the gas consumed. Not knowing the temperature at the meter can lead to either of an under or over accounting for the gas sold (i.e., delivered).

Further, there are general telemetry measurements that cannot be economically transported back to an associated gas utility since many of the measurement sites lack power for radio systems, and since cellular modems require large batteries that need frequent replacement.

United States Patent Application Publication 2008/0177678 A1 to DiMartini et al. discloses a method described as communicating between a utility and its customer locations. United States Patent Application Publication 2006/0031180 A1 to Tamarkin et al. describes integrated metrology systems and information and control apparatus for interaction with integrated metrology systems. U.S. Pat. No. 7,069,161 B2 to Gristina et al. discloses a system described as managing resource infrastructure and resource consumption in real time. The complete disclosures of all United States Published patent applications and patents mentioned herein are fully incorporated herein by reference for all purposes.

While various implementations of telemetry systems have been developed, and while various integrated metrology systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodology for carrying out utility related measurements and other two-way communications over an Advanced Metering Infrastructure (AMI) are provided.

In an exemplary configuration, utility related measurement data are carried over AMI networks by way of nodes and endpoints requiring very low power consumption.

In one of their simpler forms, battery powered endpoints are provided that eliminate the need for AC power at telemetry sites.

Another positive aspect of the present type of apparatus and methodology is that it significantly reduces the cost of monitoring utility consumption and system integrity activities. In exemplary configurations, monitoring of gas pressure and temperature correctors, among other adjunct data groups, is simplified.

In accordance with aspects of certain embodiments of the present subject matter, methodologies are provided to relatively more quickly identify faults and alarms and report such through the data collecting AMR/AMI system.

In accordance with certain aspects of other embodiments of the present subject matter, methodologies have been developed to monitor electronic pressure recorders to allow utilities to monitor their distribution system and maintain overall system integrity.

In accordance with further aspects of still further embodiments of the present subject matter, alarm mechanisms and two-way communications capabilities are provided in an AMR system that provides greater insight into the general health of a gas distribution system.

In accordance with yet still further aspects of the present subject matter, a new endpoint device is provided that may be personalized to accommodate communications in an AMR system between the AMR/AMI network and selected distribution system related parameter measuring devices.

One exemplary embodiment of the present subject matter relates to a telemetry system for transmitting data related to operational conditions and utility usage between user locations and a centralized data collection facility. Such an exemplary system preferably comprises a plurality of endpoint devices associated with respective locations of utility usage, for transmitting utility usage data associated with its respective location, with at least selected of such endpoint devices respectively further including an adjunct data module for receipt of adjunct data; a plurality of telemetry devices respectively associated with such adjunct data modules of such selected endpoint devices, for monitoring preselected operational conditions at such respective telemetry devices and providing adjunct data thereon to its associated adjunct data module for transmission by its associated selected endpoint device; a main communications network; at least one collector, for communications with such endpoint and telemetry devices and such main communications network; and a head end processor for communications with such main communications network. With such a system, advantageously utility usage data and adjunct data are collected and communicated to such head end processor via such main communications network.

In one present alternative such telemetry system, such selected endpoint devices may further include memory means for storage of uncorrected utility usage at their respective associated locations; such telemetry devices may comprise correctors for a gas AMI network and such adjunct data comprises corrected utility usage data; and such selected endpoint devices may periodically forward both uncorrected and corrected utility usage data to such head end processor. In other alternatives, such telemetry devices may optionally respectively include alarm means for forwarding alarm signaling whenever monitored conditions thereat fall outside set parameters.

Per still other present alternative telemetry system arrangements, such main communications network may be bidirectional; such telemetry devices may comprise correctors for a gas AMI network and such adjunct data comprises corrected utility usage data; such selected endpoint devices may further include memory means for storage of uncorrected utility usage and corrected utility usage data at their respective associated locations; such telemetry devices may respectively include alarm means for forwarding alarm signaling whenever monitored conditions thereat fall outside set alarm parameters; such selected endpoint devices may be responsive to periodically forwarded commands thereto via such bidirectional main communications network for transmitting both uncorrected and corrected utility usage data to such head end processor; and such telemetry devices may be responsive to forwarded commands thereto via such bidirectional main communications network for changing the setting of alarm parameters.

Still per further present alternatives, such utility usage may comprise gas consumption; and at least selected of such telemetry devices may monitor at least one of temperature and pressure conditions at an associated endpoint device location, whereby an associated gas utility can correct gas usage billing based on micro-climactic conditions at an associated endpoint device location. Further, at least selected of such telemetry devices may comprise voltage measurement devices for identifying faults in associated cathodic protection apparatus. Also, such head end processor may further include data management functionality, for storing and processing gas usage data; and such main communications network may comprise one of a WAN, a wireless network, and the internet.

Another exemplary embodiment of the present subject matter may relate to a bidirectional gas AMI telemetry network for transmitting data related to corrected and uncorrected gas usage between user locations and a centralized data collection facility. Such a present exemplary telemetry network may preferably comprise a plurality of endpoint devices for monitoring and transmitting uncorrected gas usage data associated with its respective location; a plurality of corrector telemetry devices, respectively associated with at least selected of such endpoint device locations, for monitoring gas usage data and at least one preselected physical condition at such telemetry device, and for providing corrected gas usage data to its associated endpoint device for storage and transmission thereby; a main communications network; a plurality of data collection devices, for bidirectional communications with selected of such endpoint and telemetry devices and such main communications network; and a centralized data collection facility in bidirectional communication with such main communications network, for receiving and processing corrected and uncorrected gas usage data from such at least selected of such endpoint device locations.

Per present exemplary variations of such a network, such corrector telemetry devices may monitor at least one of temperature and pressure conditions at such telemetry device, whereby an associated gas utility can obtain corrected gas usage data based on micro-climactic conditions. Further, such bidirectional communications of such data collection devices may comprise wireless communications; and at least selected of such endpoint devices may include battery-operated power supplies.

Other present alternative networks may further comprise a plurality of protection system telemetry devices respectively comprising voltage measurement devices for identifying faults in associated cathodic protection apparatus, whereby such telemetry network combines cost effective system integrity functionality with gas usage monitoring for gas utilities.

Per other alternatives, an exemplary present network may further includes a plurality of protection system telemetry devices respectively comprising voltage measurement devices for identifying faults in associated cathodic protection apparatus; with selected of such corrector telemetry devices monitoring temperature and pressure conditions at selected of such endpoint device locations, for use in correcting gas usage billing based on micro-climactic conditions; with such bidirectional communications of such data collection devices comprising wireless communications; and with such telemetry network further including meter data management means associated with such centralized data collection facility, for storing and processing data received via such telemetry system, whereby usage data and gas delivery system integrity are efficiently monitored via an integrated system.

In other present alternative networks, such corrector telemetry devices may respectively include alarm means for forwarding alarm signaling whenever monitored conditions thereat fall outside set parameters. In yet further alternative present networks, such main communications network may comprise one of a WAN, a wireless network, and the internet; and such corrector telemetry devices may be responsive to changes to alarm parameters sent thereto via such bidirectional main communications network.

Those of ordinary skill in the art should appreciate from the complete disclosure herewith that the present subject matter equally relates both to apparatus and to corresponding and associated methodology. One present exemplary method relates to gathering corrected and uncorrected data for utility measurements at utility usage points, comprising determining uncorrected utility usage data for a plurality of endpoint devices associated with respective locations of utility usage; monitoring for preselected operational conditions at selected of such utility usage locations, and creating corrected utility usage data based on such monitored conditions; transmitting the corrected and uncorrected utility usage data to at least one collector; and communicating such data to a head end processor via such collector and a main communications network. Per such methodology, advantageously both corrected and uncorrected utility usage data are collected and communicated to a central location for processing, to permit efficient monitoring of utility usage and associated conditions by a utility provider.

Alternative methodology present embodiments may further include monitoring for a plurality of preselected operational conditions at selected utility usage locations and creating data related thereto. Still further, they may additionally include conducting data management at the central location, for storing and processing gas usage data.

In other present alternative methods, the utility measurements may comprise monitoring gas consumption; the operational conditions may include at least one of temperature and pressure conditions at an associated gas consumption location; and central location processing may include correcting gas usage billing based on micro-climactic conditions at an associated gas consumption location.

Per yet other present alternative methodologies, the operational conditions may further include voltage measurements for identifying faults in cathodic protection apparatus associated with a gas pipeline of a gas utility provider; and such alternative method may further include providing alarms to the central location based on comparisons of monitored operational conditions with alarm parameters. In certain of such variations, the main communications network may comprise one of a WAN, a wireless network, and the internet; and the main communications network may be bidirectional so that changes to alarm parameters can be sent from the central location to other components associated with the endpoint devices.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figure, in which.

Figure 1:
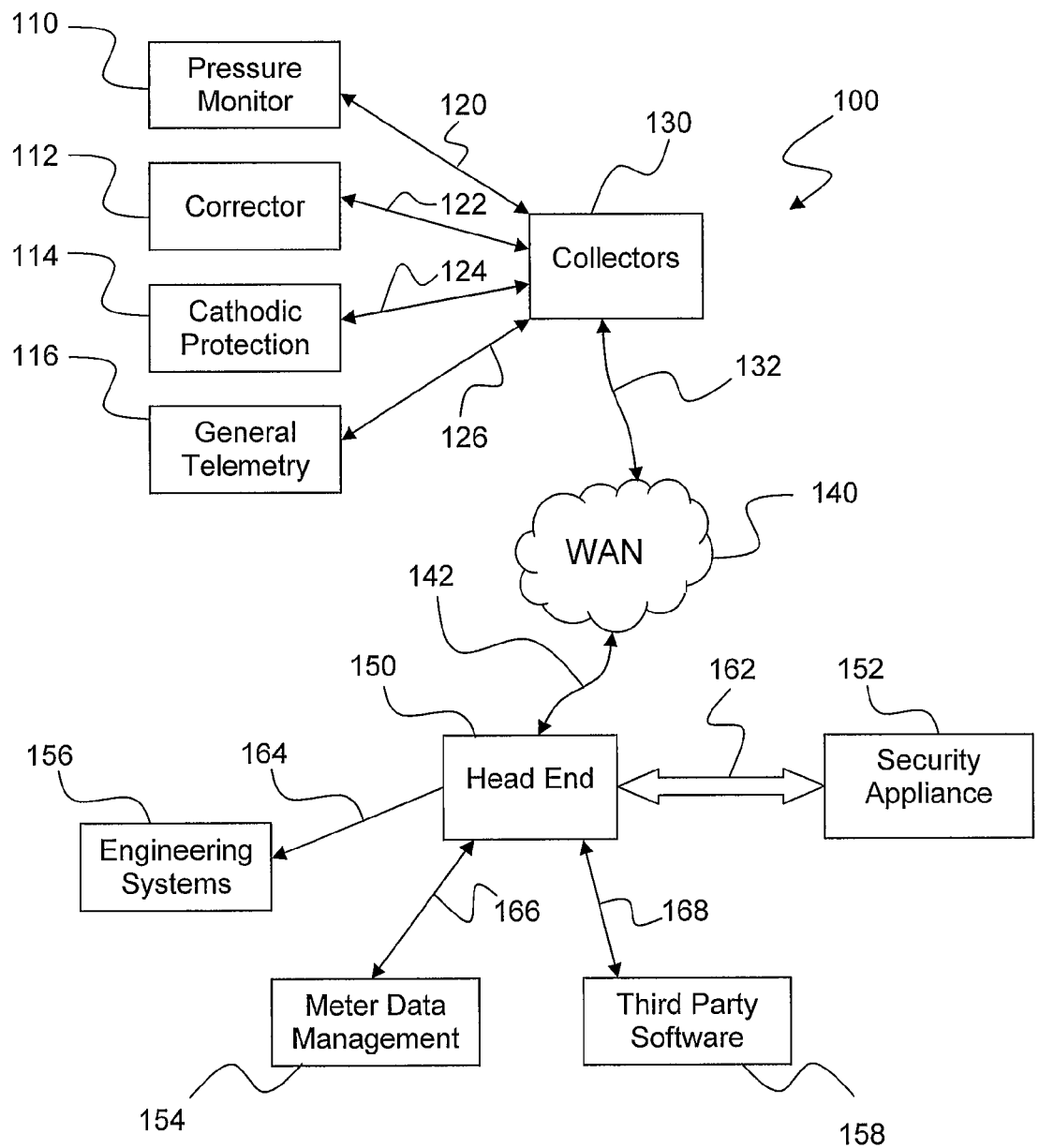
FIG. 1 is a block diagram of an exemplary telemetry system constructed in accordance with the present subject matter.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with for carrying out improved utility related measurements and other two-way communications over an Automatic Meter Reading/Advanced Metering Infrastructure (AMR/AMI).

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference is made in detail to the presently preferred embodiments of the subject telemetry system. Referring now to the drawings, FIG. 1 illustrates an exemplary telemetry system generally 100 in accordance with the present subject matter. System 100 may include various exemplary telemetry endpoints 110, 112, 114, and 116 located within, for example, a Gas AMI network, and which are read by network collectors 130. Telemetry endpoints may include, but are not limited to, a pressure monitor 110, a data corrector 112, cathodic protection apparatus 114, and general telemetry apparatus 116. Such exemplary telemetry endpoints 110, 112, 114, and 116 may be connected for data transmission via transmission paths 120, 122, 124, and 126, respectively, to collectors 130.

It should be appreciated that while transmission paths 120, 122, 124, and 126 are presently illustrated as transmission lines, such is not a specific limitation of the present technology as data may be transmitted by any suitable technology, including via wired as well as wireless technology. In similar fashion, transmission paths 162, 164, 166, and 168 (illustrated as variously coupled data between head end associated items) may also correspond to any suitable data transmission capable device or methodology, now existing or later developed. In accordance with present subject matter, the technology described herein is designed to reduce the operating costs associated with system integrity functions and the collection of consumption related information for gas utilities, and is thus not limited by the exemplary methodology and apparatus illustrated.

Those of ordinary skill in the art will appreciate that the illustration in FIG. 1 with respect to the network configuration is exemplary and that other components, for example, but not limited to, repeaters, may also be employed. It should be appreciated that while the present subject matter is described more specifically as directed to gas AMI networks, such is not a specific limitation of the disclosure as the present disclosure may be extended to water and electric networks, as applicable, particularly as to selected portions of the present disclosure, for example, such as relating to alarm notifications and data handling.

Further, while the present communications system is described as a network, other and additional communication forms including the use of mobile data collection apparatus may be employed within the scope of the present disclosure. Still further, while the present disclosure describes the use of a WAN to transmit information among selected devices, such is illustrative only as other information exchange apparatus may be used to provide desired communications including, but not limited to, WAN's, LAN's, all varieties of wireless systems, and the Internet, and intended to include other later developed technologies.

In accordance with present exemplary disclosure, information from such exemplary endpoints 110, 112, 114, and 116 may be processed in the collectors 130 and sent over a WAN generally 140 to a head end system generally 150 by way of exemplary transmission paths 132, 142. The head end system 150 may further process the endpoint reading or data and send that information to other systems. Long-term storage can, of course, be provided by, for example, a meter data management (MDM) system generally 154, not presently illustrated in detail, and details of which form no particular aspect of the present subject matter. Such system 154 may also be considered as meter data management means associated with the head end or centralized data collection facility, for storing and processing data received via the telemetry system generally 100. With such arrangements, when incorporating the cathodic protection monitoring, advantageously usage data and gas delivery system integrity are efficiently monitored via an integrated system.

For telemetry, there may be other systems that are not part of an AMR/AMI network, such as engineering systems generally 156 that monitor distribution system pressure, or software systems generally 158 provided by the manufacturer of the correctors 112 or other components monitored by the endpoints. Other systems, not presently illustrated, may also be included in system 100. Also, the representative endpoints 110, 112, 114, and 116 are intended to be understood by those of ordinary skill in the art as representing any number of such endpoints in use in a given system configuration in accordance with present subject matter, variously and respectively associated with collectors as needed.

Endpoints 110, 112, 114, and 116 "bubble-up" readings of the telemetry data periodically as needed for measurement resolution and network reliability. As described, for example, in U.S. Pat. No. 7,298,288 B2, assigned to the owner of the present technology, battery-powered endpoints have been designed to limit the power consumed in day-to-day operation. One known design feature is a bubble-up mode of operation, in which an endpoint "bubbles-up," or activates its transceiver to communicate or attempt to communicate with the AMR data collection system, according, for example, to a preset schedule. The time duration or period between bubble-up events may typically span seconds or minutes.

In accordance with present subject matter, endpoints 110, 112, 114, and 116 may also contain alarm thresholds. Per the present subject matter, when such thresholds are exceeded, the associated endpoint will initiate an alarm to relatively rapidly indicate an over/under threshold situation to the head end 150. Such alarms may take the form of special messages and may be sent at a higher frequency than normal transmissions to ensure rapid and reliable delivery. Per present subject matter, parameters stored in collectors 130 may also be changed through the use of two-way commands from the system head end 150 down to the collectors.

Collectors 130 validate the readings from the endpoints 110, 112, 114, and 116 and prioritize the uploading of data to the head end 150. Collectors 130 can also evaluate data from the endpoints 110, 112, 114, and 116 and generate alarms as well, per the present subject matter.

At head end 150, data is further validated, alarms may also be generated, and alarms and data are exported to an external system, all per present subject matter. Head end 150 can also accept requests from an external system (not presently illustrated) to send reconfiguration messages through the network to the endpoints 110, 112, 114, and 116, all per the present subject matter.

Figure 2:
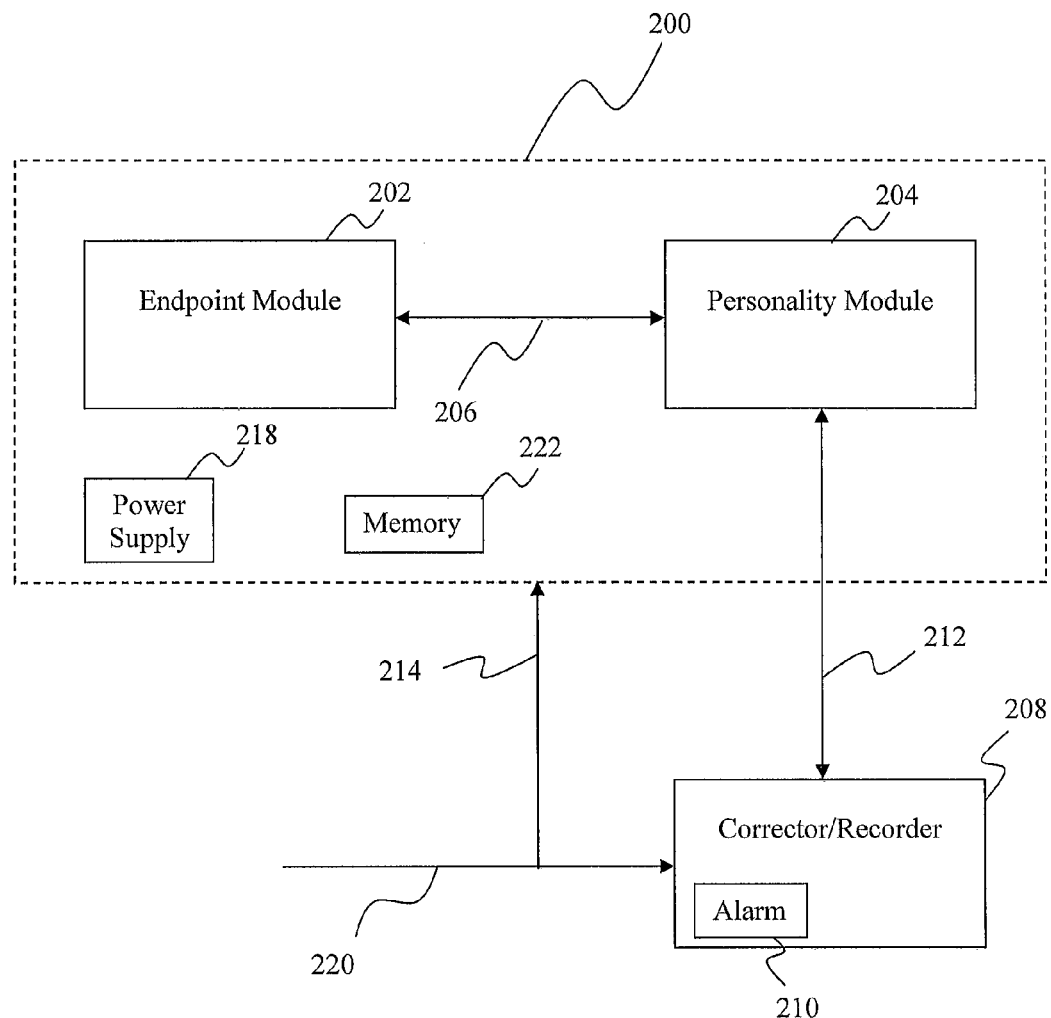
FIG. 2 is a block diagram of an endpoint device constructed in accordance with the present subject matter to provide distribution system and consumption related telemetry via a meter reading system.

With reference now to FIG. 2, there is illustrated a representative exemplary block diagram of an endpoint device generally 200 constructed in accordance with the present subject matter to provide distribution system and consumption related telemetry via a meter reading system. As previously noted, gas utilities may employ correctors such as corrector 112 (FIG. 1) to compensate meter readings for pressure and temperature to more accurately calculate gas usage. An exemplary such corrector may be a Mercury Instruments MMX corrector. Such types of correctors (known in the industry) return information in the form of corrected pulse counts but are presently capable of reporting only a single corrected reading via an AMR system.

In accordance with the present subject matter, a new endpoint device generally 200 is provided that corresponds to an endpoint module 202 coupled for example to a personality module 204 via a serial communications link generally 206. It should be appreciated that endpoint module 202 and personality module 204 may be provided as a single entity in some exemplary embodiments. Endpoint module 202 is generally similar to standard protocol RF protocol endpoint modules but is extended to support specific selected telemetry messages. Personality module 204 serves as an interface between endpoint module 202 and a corrector, recorder, or alternatively other similar type device, all representatively designated as collector/recorder generally 208, and provides appropriate communications translations between endpoint module 202 and corrector/recorder 208 via communications link 212. Endpoint module 200 may also be coupled to an alarm pulse output 210 associated with corrector/recorder 208 via, for example, communications link 212 or other suitable paths, to detect and respond to alarm conditions. Such output 210 and related functionality may in alternative context be considered as alarm means for forwarding alarm signaling whenever monitored conditions thereat fall outside set parameters.

In the instance that corrector/recorder generally 208 is a corrector, endpoint device 200 may be provided with a pulse input 214 that can read a mechanical gas volume pulse input 220 that feeds the corrector, thereby providing a backup, uncorrected volume reading. As an optional feature, endpoint device 200 may be provided with its own battery or power source 218 independent of corrector/recorder 208, thus allowing it to function even when the connected device has lost power.

Endpoint device 200 collects data logged by the corrector through the serial connection 206 via personality module 204. Preferably, for example, on a regularly scheduled interval, which in an exemplary embodiment may be hourly, endpoint device 200 per the present subject matter may request the corrected volume for the most current time period stored in the corrector's log. Such data is then stored in endpoint device 200 memory generally 222. In such instance, such memory and associated functionality may in other context be perceived as memory means for storage of corrected utility usage data at their respective associated locations. In other instances and alternative embodiments and arrangements, it will be understood from the complete disclosure herewith that such memory functionality may be directed to storage of uncorrected utility usage at respective associated locations, and still further, may in some instances involve storage of both uncorrected utility usage and corrected utility usage data. Corrected volume data is transmitted by endpoint device 200 via endpoint module 202 in an interval data message consistent with existing protocol. The transmitted message per present subject matter may contain the latest reading plus readings from a selected plurality of previous readings. For example, in a present exemplary embodiment, the previous seven hours of deltas may be transmitted.

Such present subject matter message is transmitted at a programmable bubble-up rate which may be adjusted depending on meter reading system requirements. In such manner, endpoint device 200 reports the corrected volume reading to a meter reading system, and the reading is always consistent with the log data in the corrector. In the case of a Fixed Network, such reading would preferably be received by a collector such as collector 130 (FIG. 1) and delivered to the head end 150 continuously through the day (or reporting cycle), offering a relatively low latency daily (or periodic) read and hourly interval data. For a Mobile System, such data could be read during a normal read cycle.

Further in accordance with the present subject matter, endpoint device 200 also collects the mechanical uncorrected pulse counts at input line 214 and stores such data in its memory 222. Because such data is collected independently from a corrector, such data collection advantageously represents a backup mechanism to collect meter reads. If the corrector were to malfunction, the mechanical uncorrected read could be used for billing with appropriate correction factors estimated, or utilizing other forms of acceptable estimation schemes, depending on applicable regulatory requirements.

Per present subject matter, mechanical uncorrected consumption data could either be transmitted to a meter reading system as a bubble-up message that is routinely transmitted at a programmable rate, or it could be collected through a two-way command exchange. In either case, per practice of the present subject matter, retrieval of selected interval consumption data is possible for either of a Fixed Network or a Mobile system. The ability to collect both corrected and uncorrected volume data in a meter reading system through a single endpoint device constitutes an advantageous facet of certain embodiments in accordance with the present subject matter.

Per present subject matter, in the case that corrector/recorder 208 is a pressure recorder, endpoint device 200 may alternatively collect pressure data logged by an electronic pressure recorder in a manner similar to the corrector except the data of interest is pressure. On a regularly scheduled interval, endpoint device 200 may request a gas pressure reading for the most current time interval, e.g., one hour, stored in the pressure recorder's log. Such data per present subject matter may then be stored in the endpoint device 200 memory 222. The gas pressure reading may then be transmitted by endpoint device 200 in an interval data message just as in the case of the corrector's corrected volume reading. The message advantageously may contain the latest pressure reading plus a previous selected number of deltas, e.g., seven deltas (though other numbers may be practiced).

Again, for a Fixed Network system, such approach advantageously allows pressure data to be received by the collector 130 and delivered to the head end 150 continuously throughout the day. For a Mobile system, such data may advantageously be retrieved during a normal read cycle, per the present subject matter.

In addition to volume and pressure data, endpoint device 200 per the present subject matter can support collecting additional data points that corrector/recorder 208 may log. Such data may be retrieved through two-way commands by either of a Fixed Network or Mobile collector. In the case of a Fixed Network, such data could be automatically requested at routine intervals to maintain a log of interval data throughout a predetermined time period, e.g., a day. In the case of a Mobile system, the collector could request, for example, the current reading and historical interval data.

Endpoint device 200 may also be configured to support alarms, for example, in both a corrector and/or a pressure recorder. When an alarm pulse is detected by endpoint device 200 through the corrector or recorder alarm pulse output 210, preferably in some present embodiments, endpoint device 200 queries the corrector or recorder through the serial interface 206 and personality module 204 to determine the cause of the alarm. Optionally, per other present exemplary embodiments, in the case of an alarm associated with an out of threshold value such as high/low pressure, endpoint device 200 may also automatically query the current value to report that along with the associated alarm indication. Once the alarm cause is detected, the alarm status can be presented to the meter reading system through a special alarm message that may be transmitted relatively immediately by endpoint device 200.

Such relatively immediately transmitted message may contain both status information indicating the cause of the alarm and any associated data with such alarm. In the case of a Fixed Network, an alarm message would preferably be received by collector 130 and relatively immediately sent to head end 150 for high priority processing. Alternatively, it is also possible per certain embodiments of the present subject matter that a status bit in the normal bubble-up interval data message could be set to indicate an alarm condition where the specific bit set identifies the cause of the alarm. In such a present exemplary embodiment, the Fixed Network collector would then detect the alarm condition on the next regularly scheduled bubble-up and could again relatively immediately send the alarm indication to the head end 150 for high priority processing. The detection of the alarm condition could also trigger an automatic two-way communication between the collector and endpoint device 200 to retrieve additional information. A Mobile system would also be able to interpret the alarm status bit and, if desired for given present embodiments, execute additional two-way commands in response to such an alarm.

Endpoint device 200 may be configured per certain present embodiments to support relative time consistent with other endpoint devices. Such feature advantageously allows the Fixed Network or Mobile collectors to set an internal time clock for endpoint device 200 through a two-way transaction. Endpoint device 200 can then set the time in corrector/recorder 208, thus maintaining consistent, accurate time in all system elements.

Two-way communication support to endpoint device 200 also provides the ability to set parameters such as alarm thresholds in the corrector/recorder 208 through the meter reading system. Such functionality advantageously allows the user the ability to make settings at the head end 150 and have the collector 130 transmit such settings to the corrector/recorder 208 through the meter reading system collectors. Security mechanisms, for example Security Appliance 152 (FIG. 1)—developed for the meter reading system—may be utilized to add authentication of two-way commands to endpoint device 200, thereby advantageously providing secure configuration to corrector/recorder 208.

Figure 3:
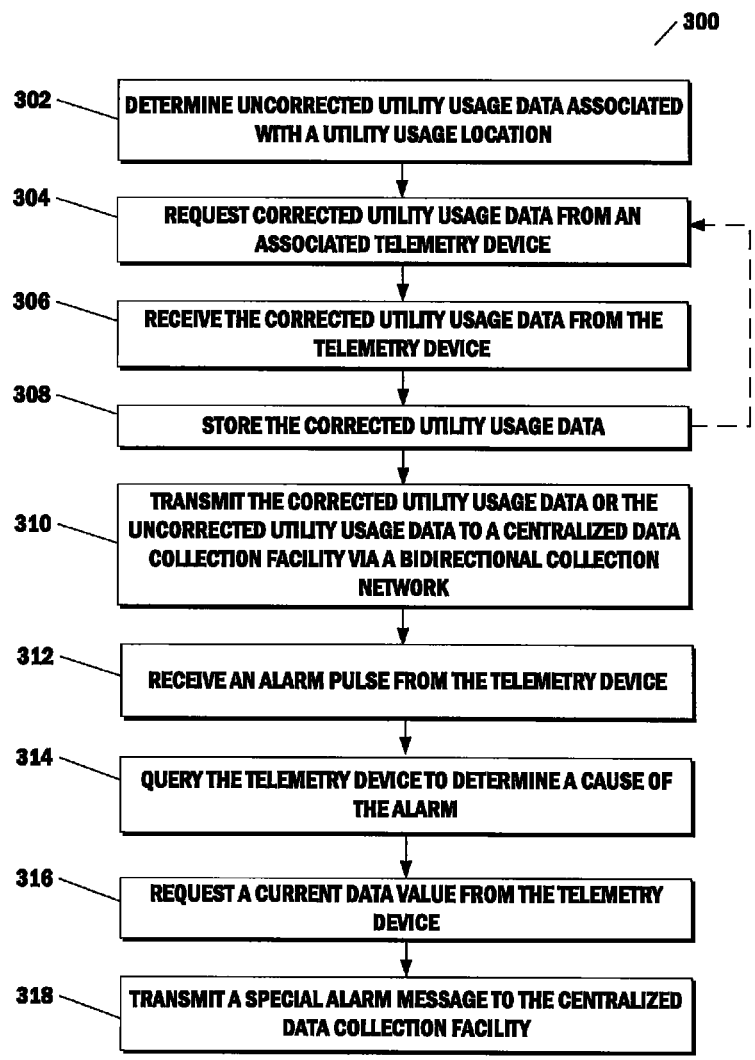
FIG. 3 is a flowchart of an exemplary method in an endpoint device for gathering corrected and uncorrected data for utility measurements at a utility usage location according to an exemplary embodiment of the present disclosure.

FIG. 3 is a flowchart an exemplary method (300) in an endpoint device for gathering corrected and uncorrected data for utility measurements at a utility usage location according to an exemplary embodiment of the present disclosure.

At (302) uncorrected utility usage data associated with a utility usage location can be determined. For example, the utility usage data can be gas usage data. As an example, endpoint device 200 of FIG. 2 may be provided with a pulse input 214 that can read a mechanical gas volume pulse input 220.

At (304) corrected utility usage data is requested from an associated telemetry device. As an example, endpoint device 200 of FIG. 2 can collect data logged by corrector 208 through serial connection 206 via personality module 204. Preferably, for example, on a regularly scheduled interval, which in an exemplary embodiment may be hourly, endpoint device 200 per the present subject matter may request the corrected volume for the most current time period stored in corrector 208's log. Personality module 204 can serve as an interface between the endpoint and the telemetry device and can provide appropriate communications translations.

At (306) the corrected utility usage data is received from the telemetry device. At (308) the corrected utility usage data is stored at the endpoint device. As an example, the corrected utility usage data can be stored in endpoint device 200 memory generally 222. As shown in FIG. 3, steps (304)-(308) can be performed periodically.

At (310) the corrected or the uncorrected utility usage data is transmitted from the endpoint device to a centralized data collection facility via a bidirectional collection network. As an example, corrected volume data can be transmitted by endpoint device 200 via endpoint module 202 in an interval data message consistent with existing protocol. The transmitted message per present subject matter can contain the latest reading plus readings from a selected plurality of previous readings. For example, in a present exemplary embodiment, the previous seven hours of deltas may be transmitted.

As another example, mechanical uncorrected consumption data could either be transmitted to a meter reading system as a bubble-up message that is routinely transmitted at a programmable rate, or it could be collected through a two-way command exchange. In either case, per practice of the present subject matter, retrieval of selected interval consumption data is possible for either of a Fixed Network or a Mobile system. The ability to collect both corrected and uncorrected volume data in a meter reading system through a single endpoint device constitutes an advantageous facet of certain embodiments in accordance with the present subject matter.

At (312) an alarm pulse can be received from the telemetry device. For example, endpoint device 200 can be configured to support alarms.

At (314) the telemetry device can be queried to determine a cause of the alarm. As an example, when an alarm pulse is detected by endpoint device 200 through the corrector or recorder alarm pulse output 210, endpoint device 200 queries the corrector or recorder through the serial interface 206 and personality module 204 to determine the cause of the alarm.

At (316) a current data value can be requested from the telemetry device. As an example, in the case of an alarm associated with an out of threshold value such as high/low pressure, endpoint device 200 may also automatically query the current value to report that along with the associated alarm indication.

At (318) a special alarm message can be transmitted from the endpoint device to the centralized data collection facility via the bidirectional collection network. The special alarm message can indicate the cause of the alarm and can include the current data value. As an example, once the alarm cause is detected, the alarm status can be presented to the meter reading system through a special alarm message that may be transmitted relatively immediately by endpoint device 200. Such relatively immediately transmitted message may contain both status information indicating the cause of the alarm and any associated data with such alarm. In the case of a Fixed Network, an alarm message would preferably be received by collector 130 and relatively immediately sent to head end 150 for high priority processing.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method in an endpoint device for gathering corrected and uncorrected data for utility measurements at a utility usage location, comprising:

determining uncorrected utility usage data associated with the utility usage location;

requesting corrected utility usage data from an associated telemetry device;

receiving the corrected utility usage data from the telemetry device;

storing the corrected utility usage data; and transmitting the corrected utility usage data or the uncorrected utility usage data to a centralized data collection facility via a bidirectional collection network;

wherein determining uncorrected utility usage data associated with the utility usage location includes:

reading, independently of the telemetry device, a volume pulse to determine the uncorrected utility usage data; and storing the uncorrected utility usage data;

wherein the requesting, receiving, and storing the corrected utility usage data are performed on a periodic basis; and wherein the transmitting the corrected utility usage data or the uncorrected utility usage data to the centralized data collection facility via the bidirectional collection network includes:

periodically transmitting the corrected utility usage data as a first bubble-up message;

identifying when the telemetry device is malfunctioning; and transmitting the uncorrected utility usage data as one of a second bubble-up message or in response to a two-way command exchange when the telemetry device is malfunctioning.

2. The method of claim 1, wherein the transmitting the corrected utility usage data or the uncorrected utility usage data to the centralized data collection facility via the bidirectional collection network further comprises:

receiving a two-way command message via the bidirectional collection network, the command message requesting specified intervals of corrected utility usage data and specified intervals of uncorrected utility usage data; and transmitting a response message via the bidirectional collection network in response to the command message, the response message including the specified intervals of corrected utility usage data and the specified intervals of uncorrected utility usage data.

3. The method of claim 1, wherein the requesting corrected utility usage data from the associated telemetry device comprises:

generating a request for the corrected utility usage data;

translating the request using a personality module included in the endpoint device, the personality module providing an interface between the endpoint device and the telemetry device; and transmitting the translated request to the telemetry device.

4. The method of claim 1, wherein the requesting and the receiving of the corrected utility usage data are performed across a serial communications link.

5. The method of claim 1, further comprising:

receiving an alarm pulse from the telemetry device;

querying the telemetry device to determine a cause of the alarm;

requesting a current data value from the telemetry device; and transmitting a special alarm message to the centralized data collection facility via the bidirectional collection network, the special alarm message indicating the cause of the alarm and including the current data value.

6. An endpoint device for gathering corrected and uncorrected data for utility measurements at a utility usage location, the endpoint device comprising:

an endpoint data module; and a memory communicatively coupled with the endpoint data module, wherein the endpoint data module is configured to:

determine uncorrected utility usage data associated with the utility usage location;

request corrected utility usage data from an associated telemetry device;

receive the corrected utility usage data from the telemetry device;

store the corrected utility usage data in the memory; and transmit the corrected utility usage data or the uncorrected utility usage data to a centralized data collection facility via a bidirectional collection network, wherein the determining uncorrected utility usage data associated with the utility usage location includes:

reading, independently of the telemetry device, a volume pulse to determine the uncorrected utility usage data; and storing the uncorrected utility usage data in the memory;

wherein the requesting, receiving, and storing the corrected utility usage data are performed on a periodic basis; and wherein the transmitting the corrected utility usage data or the uncorrected utility usage data to the centralized data collection facility via the bidirectional collection network includes:

periodically transmitting the corrected utility usage data as a first bubble-up message;

identifying when the telemetry device is malfunctioning; and transmitting the uncorrected utility usage data as one of a second bubble-up message or in response to a two-way command exchange when the telemetry device is malfunctioning.

7. The endpoint device of claim 6, wherein the transmitting the corrected utility usage data or the uncorrected utility usage data to the centralized data collection facility via the bidirectional collection network further comprises:

receiving a two-way command message via the bidirectional collection network, the command message requesting specified intervals of corrected utility usage data and specified intervals of uncorrected utility usage data; and transmitting a response message via the bidirectional collection network in response to the command message, the response message including the specified intervals of corrected utility usage data and the specified intervals of uncorrected utility usage data.

8. The endpoint device of claim 6, further comprising:

a personality module configured to provide an interface between the endpoint device and the telemetry device, wherein the requesting corrected utility usage data from the associated telemetry device includes:

generating a request for the corrected utility usage data;

translating the request using the personality module; and transmitting the translated request to the telemetry device.

9. The endpoint device of claim 6, wherein the requesting and the receiving of the corrected utility usage data are performed across a serial communications link.

10. The endpoint device of claim 6, wherein the endpoint data module is further configured to:

receive an alarm pulse from the telemetry device;

query the telemetry device to determine a cause of the alarm;

request a current data value from the telemetry device; and transmit a special alarm message to the centralized data collection facility via the bidirectional collection network, the special alarm message indicating the cause of the alarm and including the current data value.

* * * * *